United States Patent [19]
Langecker

[11] 3,759,643
[45] Sept. 18, 1973

[54] APPARATUS FOR APPLYING LABELS ONTO HOLLOW BODIES

[76] Inventor: Erhard Langecker, Hohbuschener Weg 5, Meinerzhagen/Westphalia, Germany

[22] Filed: Feb. 17, 1972

[21] Appl. No.: 227,111

Related U.S. Application Data
[62] Division of Ser. No. 41,194, May 28, 1970, Pat. No. 3,657,415.

[30] Foreign Application Priority Data
Aug. 22, 1968  Germany.................. P 17 86 133.5
June 5, 1969   Germany.................. P 19 28 596.2

[52] U.S. Cl........... 425/109, 425/DIG. 210, 425/812
[51] Int. Cl......................... B29c 27/14, B29d 9/00
[58] Field of Search............ 425/DIG. 210, DIG. 60, 425/109, DIG. 203, 812

[56] References Cited
UNITED STATES PATENTS 2,790,994  5/1957  Cardot et al.................. 425/DIG. 60
3,272,681  9/1966  Langecker...................... 264/98 X
3,537,138  11/1970 Brown et al. ............... 425/DIG. 203
3,559,248  2/1971  Stockmann....................... 264/22 X
3,684,418  8/1972  Langecker.................. 425/DIG. 210

Primary Examiner—Richard B. Lazarus
Attorney—Watson, Cole, Grindle & Watson

[57] ABSTRACT

Apparatus for applying labels onto hollow bodies, including a blow mold having a cavity for containing a hollow body, and a member movable toward and away from the mold cavity, the member having an end conforming to the curvature of the cavity and forming a section thereof for carrying a label to be applied to the hollow body during movement of the member toward the cavity. Ventilation openings are provided in the mold for venting any air which may be present between the hollow body and the label during application. Suction openings are provided in the member for securely maintaining the label in place on the member, and pressure openings are also provided in the central portion member to cause the label to bow outwardly, thereby presenting a convex surface to the hollow body.

6 Claims, 15 Drawing Figures

3,759,643
FIG. 1
FIG. 2
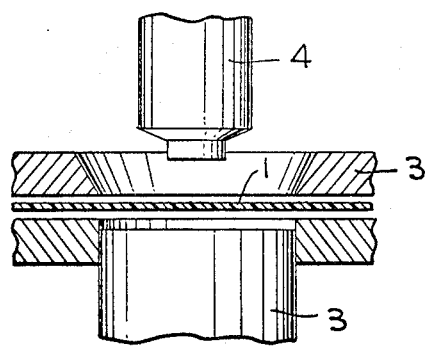
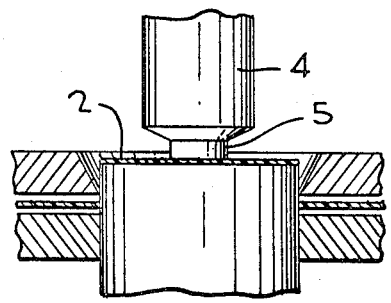
FIG. 3
FIG. 4
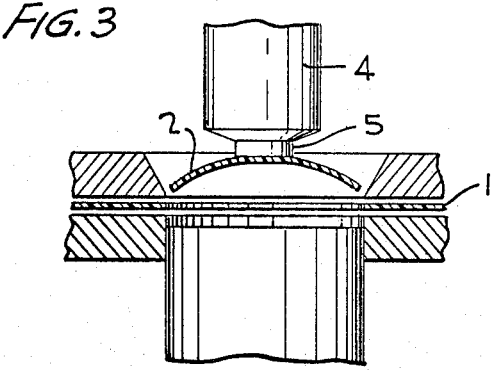
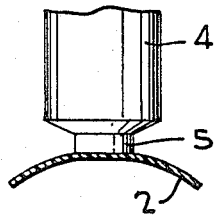
FIG. 5
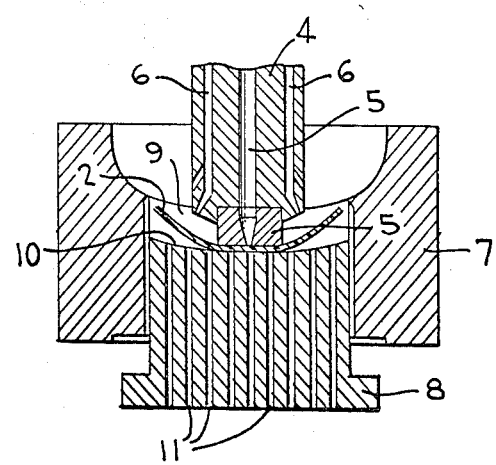

APPARATUS FOR APPLYING LABELS ONTO HOLLOW BODIES

This is a division, of application Ser. No. 41194, filed May 28, 1970 now U.S. Pat. No. 3,657,405.

This invention relates to a process and means for applying lables or plates to hollow articles of thermoplastic synthetic substances produced by blow moulding, and is a continuation-in-part of my co-pending application Ser. No. 767,719 filed on Oct. 15, 1968.

It is known that a coloured and/or printed element of a thin foil of weldable or adhesive material inserted into a blow mould may be jointed to the hollow article being moulded during inflation or blowing of the latter, an appropriate procedure applicable being that the element is fed in by insertion either from outside the mould through openings in its wall or from the inside through the line of parting of the blow mould.

In an operation of this nature for placing a label or plate on a hollow article produced by blowing, an essential problem is the prevention of air inclusions between the hollow article and the lable whilst appying the label. To this end, the surface of the label or plate coming into contact with the article has been roughened, so that air trapped during application of the label is uniformly distributed in the depressions formed by the roughening action, in this manner preventing the forming of spot-like bubbles. For the same purpose, the labels to be affixed have moreover already been produced of fabrics or porous substances, or of perforated foils. Although these foils can be affixed without forming bubbles, in the main, they have substantial shortcomings which militate against their application. The labels to be affixed commonly bear illustrations and a printed text. To prevent damaging the print or impression by wear, transparent foils are employed, the printed text being impressed on the surface which is to be laid on the surface of the hollow article. A roughening action or employing a fabric or perforated foil is unfavourable for this purpose, since the sharpness of the printed text is deleteriously affected by the roughening of the surface.

The risk prevails moreover that the cavities formed in the foil or web surface by roughening or by employing a fabric may be filled by the printing ink, so that spot like bubbles may arise in printed parts of large area since the possibility of uniform air distribution is then no longer available. The same applies in respect of perforated foils. These can also deleteriously affect the printed reproduction; the perforations may equally be clogged by the ink in the print areas, so that the information of bubbles cannot be prevented reliably either, in this case.

In the interest of sharp text reproduction of the labels, it is mandatory to employ, as labels, foils which allow clear and unobjectionable impression of the textual and pictorial subject matter. In a known label-applying method, a plunger is displaceably arranged in the opening of a blow mould, the plunger surface having a curvature corresponding to the curvature of the blown hollow article. The label to be applied to the hollow article is laid on the plunger in optional manner, for example by hand or by punching, and is held in the correct position thereon, for example the plunger may be provided with suction drillings or bores for retention of the label. The procedure employed is that during the closing operation of the blow mould, the plunger bearing the label is moved to the mould-closing position so that the label is situated in its final position relative to the hollow article during the inflation or blowing of the same. In this known form of embodiment, air bibble formation may not be entirely prevented between the label and the hollow unit when employing a label with a smooth surface, since the air present between the label and the hollow unit cannot be drawn off during the inflation of the hollow unit. It is thus usual to employ labels in the form of roughened or perforated foils.

It is an object of the invention to apply a label or plate to an article being blow-moulded in such a manner as to avoid inclusion of air between the label or plate and the article.

It is another object of the invention to provide a mould suitable for this purpose.

According to the present invention, a plunger bearing a label or plate is held during the blowing operation in a position retracted from the mould wall and, when the label or plate comes into contact with the inflating blank, the plunger is advanced to an inner position substantially flush with the moulding wall whilst the air present between the label and the blank is drawn off. The invention is based on the recognition that a bubble-free application of a label on a hollow blank may be obtained if, upon contact between the hollow blank and the label, the latter initially comes into contact with the blank at a central part of the label, thus forming ambilateral wedge-shaped airspaces on either side of the contact point, which are caused gradually to diminish by the displacement of the plunger into the mould, the label concomitantly coming into complete contact with the hollow article, since the air present in these spaces is expressed gradually outwardly. To this end, the advancing displacement of the plunger should begin when the inflation blank comes into contact with the middle of th label, to which end the feed displacement should be controlled in such manner that the plunger retracted from the mould wall and bearing the labels is displaced towards its inner position when the tubular blank comes into contact with the label. In a method of operation in which the label is punched out directly into the mould, the procedure accordingly applied is that the instant of the punching and/or displacing operation is or are selected in such manner that the contact between the label and the tubular blank equally occurs in a position in which the plunger is retracted from the wall of the mould before further advance occurs to the inner position, the air between the element and the inflation blank also being evacuated in this case.

A further feature of the invention resides in that a label punched out of a web of foil may be picked up by a transmission member, placed on the plunger and pressed against its surface by blowing. This feature offers special advantages in the case of blowing or inflation machines with several closing systems and blow moulds, since it is possible to incorporate a single punching device which is adapted to feed all the blow moulds, whilst the label produced at the punch station is placed on the plungers of the separate blow moulds by a transfer member and is pressed against the surface by blowing. It is accomplished in this manner that for each separate blow mould, the label is placed in the correct position and is pressed on the plunger held in the retracted position by means of the positively guided transfer member. If electrostatically charged foil is employed, the label pressed-on by the transfer member adheres to the plunger, whereas in the case of foils which are not electrically charged, the plunger may be equipped in manner known per se with suction ducts.

In the process according to the invention air inclusions between the label and the hollow unit are substantially prevented if the label has an essentially constant width. In the case of labels where the width varies with the label diminishing from a greater to a lesser width along its length, air inclusions may, however be formed at the point of transition between the greater and lesser width of the label. Since the peripheral shape of the plunger carrying the label must correspond to the peripheral shape of the label, the blank under inflation penetrates more deeply into the opening of the mould receiving the plunger at the points of greater width than at those of lesser width. Accordingly, the surface of the blank may come into contact with the label sooner at the point of greater width than at the area of lesser width, with concomitant formation of air inclusiions and the point of transition between the greater and lesser widths. To prevent such air inclusions in the case of labels varying in width, the process is further characterized in that prior to contact with the inflation blank, a central area of the label is convexly shaped. Due to the convexity of the label, and prior to the area of transition between different widths of the same coming into contact with the inflation blank, the area of the inflation blank tending to form air inclusions and the label are brought into premature contact, so that the air is evacuated through the wedge-shaped spaces formed at either side of the contact area.

A device for carrying out the process is characterised in that an opening of the blow mould guiding the plunger is formed with grooves intended for venting the air expressed from between the label and the blank.

The transfer member may be formed as a plunger which on its end face has one or more resilient, central and projecting suction and blast nozzles and a multiplicity of laterally situated blast nozzles. The central nozzles of the transfer member wrought as a plunger simultaneously serve the purpose of suction and blast nozzles, whereas the nozzles situated laterally are blast nozzles only. Upon picking up a label at the punching station, the central nozzles are operated as suction nozzles which retain the label until the transfer plunger comes into contact with the plunger situated in the mould opening. After this, the lateral blast nozzles are actuated, which press the label against the surface of the plunger; upon withdrawing the transfer plunger, the central nozzles are fed with blast air to free the transfer plunger from the label.

Another feature of the invention for providing a label on the mould plunger with a central convexity consists in that on its base, the plunger may have a terminal plate forming a chamber which in use is palced in communication with a source of negative pressure or suction, and that in the base of the plunger there is arranged an insert plate bridging the ducts of the area over which the label is to be convexly formed and forming a chamber in which in use is placed in communication with the source of optional suction or pressure. The chamber formed by the terminal plate can be placed in communication, through ducts or perforations with the part of the label which is to be held in contact with the surface of the plunger, whereas the chamber formed by the insert plate can be placed in communication, through ducts or perforations, with the area of the label to be convexly shaped, so that upon feeding compressed air into this chamber, the required convexity is established over the required area.

A modified form of mould is characterised in that the insert plate is arranged over the area of the plunger base corresponding to the area over which the label is to have a convexity in the chamber of the terminal plate and is equipped with a connector which can be placed in communication with a duct or perforation formed in its centre, for the source of optional suction or pressure. No insert plate is provided in the base of the plunger in this embodiment; instead, the chamber formed by the terminal plate has situated in it an intermediate plate which rests on the base of the plunger and has a central bore which can be placed in communication with a corresponding bore in the plunger. The required convex shape of the label is formed when this bore is connected to a source of compressed air, whilst all the perforations of the plunger situated in the area of the insert plate, are closed. The size of the area to be convexly formed may be varied by varying the size of the insert plate. If the convex shaping action is to occur over a small area, the size of the insert plate is chosen in such a manner that it does not cover and seal off the perforations of the plunger situated outside this area, so that these are under the action of the negative pressure prevailing in the chamber of the sealing plate or closing plate and hold the label in contact with the surface of the plunger. The size of the area of the label which is to be convexly shaped in each case can be determined in this manner.

Another modified form of the device is characterised in that an insert plate corresponding to the area to be convexly shaped, and having a central bore for the source of suction and pressure, is arranged in the end face of the plunger, an annular gap under suction pressure being formed between its periphery and the plunger. In this modification of the device, there is no insert plate situated in the chamber of the closing plate; instead, an insert plate corresponding to the size of the area to be convexly shaped is arranged in the surface of the plunger in such manner that an annular gap is formed between the edge of the insert plate and the plunger, which is in communication through a perforation of the plunger with the negative pressure chamber of the closing plate, so that the label is held in contact on the surface of the plunger at the edge of the insert plate. The central bore of the insert plate is connected to the pressure source, so that the label is convexly shaped in the area of the insert plate. The areas of the plunger surface situated externally to the insert plate are in communication, in a manner known per se, with the source of negative pressure through perforations or ducts.

Further features and advantages of the invention will be apparent from the following description of embodiments of the invention, given by way of example only and with reference to the accompanying drawings, in which:

FIGS. 1 to 4 are diagrammatic views of a punching device and transfer plunger in different operating positions;

FIGS. 5 and 6 are diagrammatic sectional views of a mould half with a label being placed on a plunger situated in an opening in the mould half;

Figure 6:
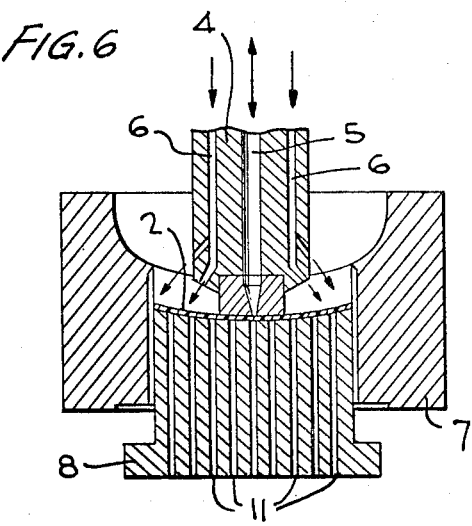

FIGS. 1 to 3 show a punching device in which labels 2 are punched out of a foil web 1 by a punching tool 3. The label punched out, label 2, is received by a transfer plunger 4, as apparent from FIG. 2. On its end face, the transfer plunger 4 has a projecting resilient nozzle 5, and as shown in FIG. 5, lateral nozzles 6. Upon receipt of the label 2, the central resilient nozzle 5 is operated as a suction nozzle, the lable 2 concomitantly being lifted out of the punching tool 3 as apparent from FIG. 3, and being carried to the mould half 7 as shown in FIG. 4. At this point, as shown in FIG. 5, the label 2 is pressed on to a plunger guided in an opening 9 of the mould half 7, by means of the resilient nozzle. The plunger 8 has an end face 10 which is curved corresponding to the ultimate shape of the hollow article being moulded. When the transfer plunger 4 comes into engagement with the plunger 8, as apparent from FIG. 5, the nozzles 5 and 6 are operated as blast nozzles according to FIG. 6, the label 2 thereby being pressed on to the end face 10 of the plunger 8. The label 2 is held in the position shown in FIG. 6, by means of suction bores 11 formed in the plunger 8.

Figure 7:
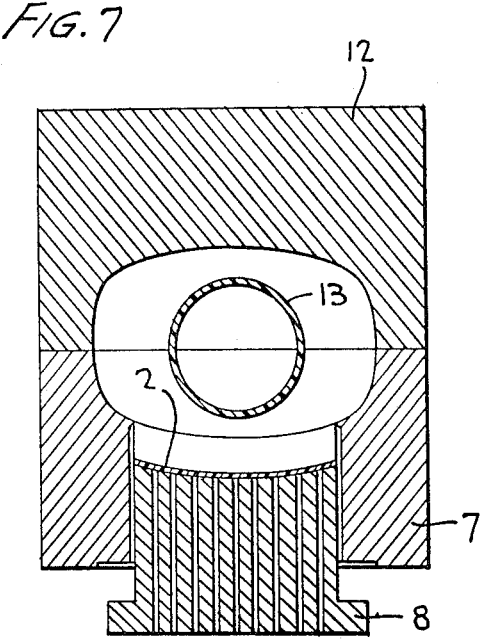
FIG. 7 is a diagrammatic illustration of the closed mould with an un-inflated tubular blank thereon.
Figure 8:
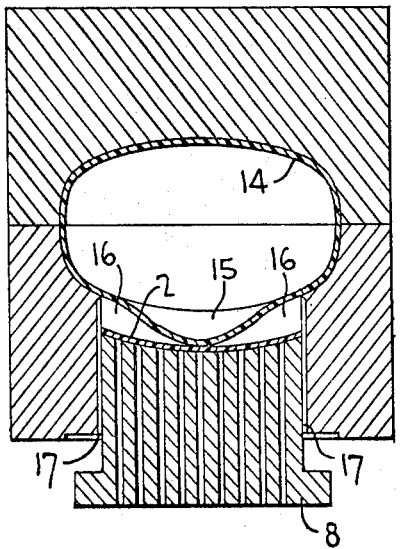
FIG. 8 is a view corresponding to FIG. 7, with the inflated blank coming into contact with the middle of the lagel.
Figure 9:
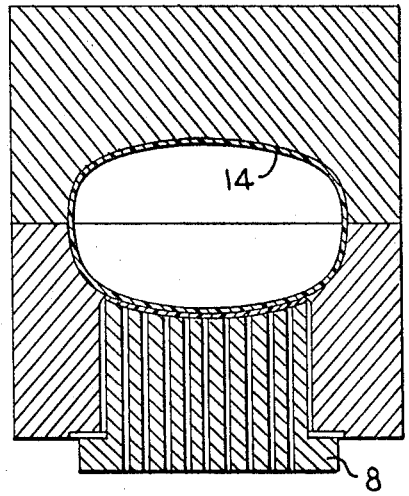
FIG. 9 is a view corresponding to FIG. 8 with the plunger at its inner position.

FIG. 7 shows the closed mould, formed by the lower mould half 7 and of an upper mould half 12. Within the mould halves 7, 12 is a moulding blank 13 in the form of a tube, which is blown up into a hollow article in the mould 7, 12. As shown by FIG. 8, the plunger 8 remains in its retracted position during inflation of the tubular blanks 13 until this blank has developed into a hollow article 14 bearing against the sides of the mould 7, 12. As shown by FIG. 8 this produces a pouch-like prominence 15 in the area of the plunger 8, this prominence coming into contact on the middle of the label. The advance of the plunger 8 into the mould closing position shown in FIG. 9 is then initiated. As apparent from FIG. 8, two hollow spaces 16 filled with air and widening in wedge shape from the middle of the label 2, are situated between the label 2 and the pouch-like prominence 15. During the feed motion of the plunger 8 from the position shown in FIG. 8 to the mould-closing position according to FIG. 9, these spaces are reduced gradually until they disappear completely (see FIG. 9). The air is concomitantly squeezed out from the middle of the label 2 towards both sides, to prevent blisters being formed between the label 2 and the pouch-like prominence 15 of the hollow unit 14. So that this air squeezed out of the spaces 16 during the displacement of the plunger 8 may be evacuated, the opening 9 of the mould half 7 has grooves 17, through which the air issuing from the spaces 16 is drawn off at the edge of the label 2, so that a full-area contact of the label 2 is produced throughout the surface. The label can project beyond the hollow unit, but it may also be recessed in the hollow unit in such a manner that its outer surface lies flush with the surface of the hollow unit.

Figure 10:
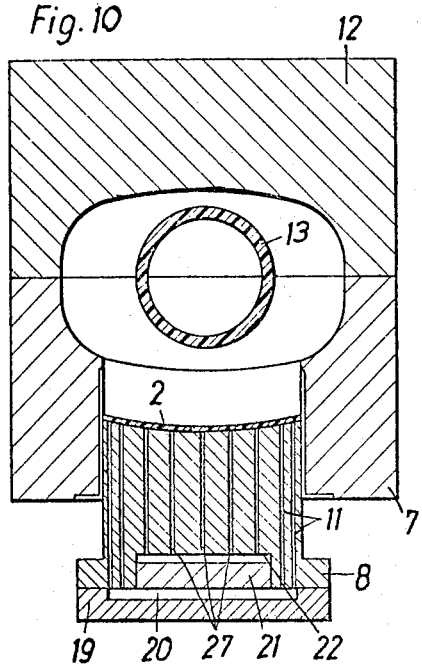
FIG. 10 is a diagrammatic view of a closed mould with an un-inflated blank and a label inserted onto a modified form of plunger.
Figure 11:
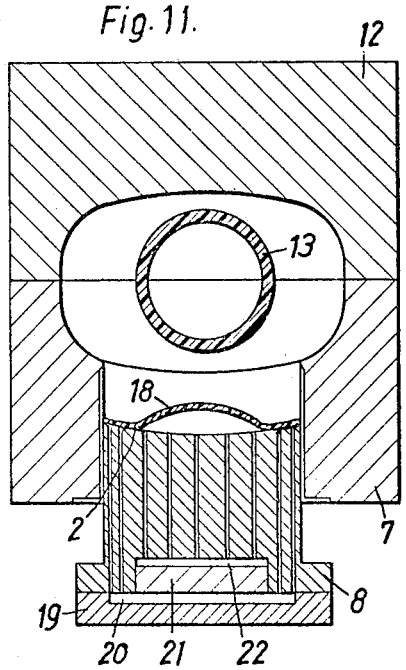
FIG. 11 is a view corresponding to FIG. 10, with the label having an upwardly directed convexity formed in its central area.

FIG. 10 shows a closed mould consisting of lower mould half 7 and of the upper mould half 12. In the mould halves 7 and 12 is situated the tubularly formed blank 13 which is to be blown into a hollow article in the mould 7, 12. Prior to inflation of the blank 13, a label 2 is convexly shaped in a central area as shown by FIG. 11. To this end, a closing or terminal plate 19 is fastened under the base of the plunger 8, forming a chamber 20 which is connected to a source of suction or negative pressure, the latter not being illustrated. The peripheral area of the label 2 is held in contact with the surface of the plunger 8, by means of this source of negative pressure. In the base of the plunger 8 is situated an insert plate 21, forming a chamber 22 in communication with a source of pressure which can generate suction as well as pressure. Upon placing the label 2 on the plunger 8, a negative pressure is applied in the chambers 20 and 22, so that the label is held firmly on the surface of the plunger. To form the convexity, pressure is fed to the chamber 22 for the purpose of forming the convexity of the area 18, compressed air passing under the label 2 through the perforations 11 situated in the area of the insert plate 21, establishing the convexity in the area 18 of the label 2.

Figure 12:
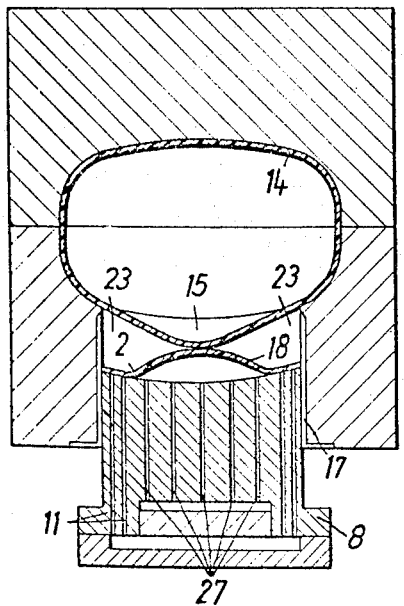
FIG. 12 is a view corresponding to FIG. 11 with the hollow article inflated and coming into contact with the label convexity.
Figure 13:
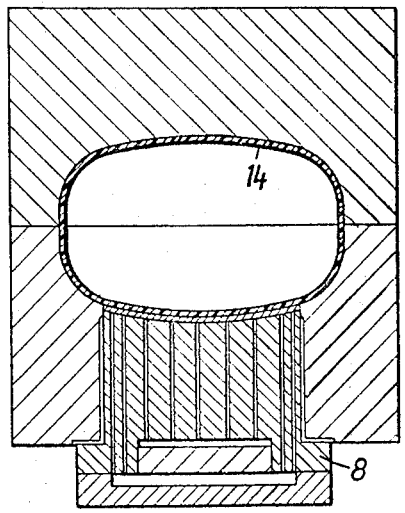
FIG. 13 is a view corresponding to FIG. 12 with the plunger in its inner positon.

After forming the convexity, the tubular blank is inflated into a hollow unit 14 bearing against the sides of the mould 7, 12. As apparent from FIG. 12, the hollow unit 14 comes into contact at a point 15 with the highest point of the convexly shaped area 18. During advance of the plunger 8 into the inner position shown in FIG. 13, the air is drawn off from the wedge-shaped intermediate spaces 23 through the grooves 17, so that an inclusion of air is prevented reliably.

Figure 14:
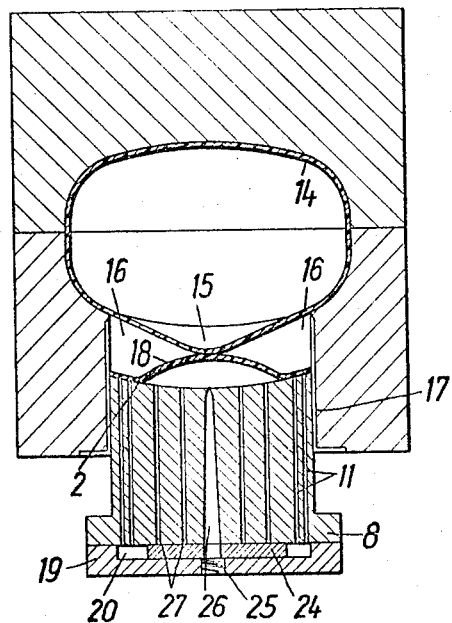
FIG. 14 is a view corresponding to FIG. 12 of another form of plunger.

In the form of embodiment according to FIG. 14, the chamber 20 has situated therein an insert plate 24 which is in contact with the base of the chamber 20 as well as with the underside of the plunger 8. The insert plate has a central bore 25 which is connected to a source of suction or compressed air, the latter not being illustrated, and is in communication with the central drilling 26 of the plunger 8. Two drillings 27 situated at either side next to the bore 26 and closed off at the underside by the insert plate 24, so that the negative pressure chamber 20 is in communication only with the two outer perforations 11 of the plunger 8 and that the label 2 is held in contact with the surface of the plunger only in the area of these perforations 11, when compressed air is fed under the label 2 through the drillings 25, 26.

The area 18 may be increased or reduced in size by dimensioning the insert plate 24 accordingly. For example, if a smaller insert plate 24 is chosen, it covers a lesser number of drillings 27, thus reducing the size of the convexly shaped area 18.

Figure 15:
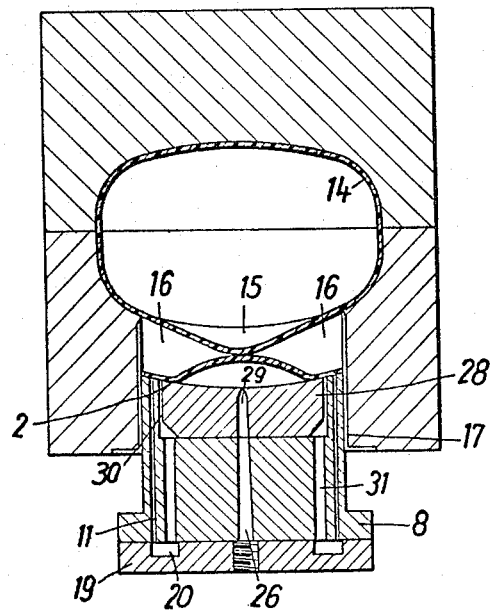
FIG. 15 is a view corresponding to FIG. 12 of yet another modified form of plunger.

FIG. 15 shows another modified form of mould in which the insert plate 24 is replaced by an insert plate 28 in the end face of the plunger 8, this insert plate 28 having a central drilling 29 which is in communication with the bore 26 of the plunger 8 and is connected to a source supplying suction or compressed air, this source not being illustrated. Between the insert plate 28 and the plunger 8 is present an annular encircling gap 30 which is in communication with the negative pressure chamber 20 through a drilling 31. Owing to the action of the negative pressure chamber 20, the label is held in contact on the surface of the plunger at the edge of the insert plate 28, whereas the convex shape of the area 18 is produced by feeding compressed air through the drilling 29, 26. In this case too, the area 18 of the convexity may be established at an optional point of the surface of the label 2 and with an optional size, by selecting an insert 28 of appropriate size and shape.

I claim:
1. An apparatus for applying labels onto hollow bodies, comprising: a blow mold having a cavity containing a hollow body; a member movable from a withdrawn to a mold-closing position at which it forms a section of said cavity, one end of said member having a curvature corresponding to the curvature of said mold cavity and being adapted to receive a label thereon to be applied onto the hollow body in said cavity when said member is in its mold-closing position; said mold having ventilation openings in communication with said cavity for venting any air out of said mold which may be present between the label and hollow body during movement of said member toward its mold-closing position; and said member having both suction openings and means for applying suction to said member one end to thereby hold the label onto said member one end, and pressure openings and means for applying pressure to the central portion of said member one end.

2. The apparatus according to claim 1 wherein said pressure openings and said suction openings respectively communicate with first and second chambers in said member.

3. The apparatus according to claim 2 wherein said first and second chambers are defined by removable plate means.

4. The apparatus according to claim 1 further including a transfer device for picking up the label from a supply station and transferring it to said one end of said member.

5. The apparatus according to claim 4 wherein said transfer device is provided with direct means for applying both suction to one end of said transfer device to thereby hold the label in place during pick-up, and for applying positive pressure through said device one end to thereby transfer the label to said member one end.

6. The apparatus according to claim 5 further including a device for initially punching the label out of a sheet of material.

* * * * *